May 5, 1959           K. H. FAULK           2,884,763
STORAGE OF LIQUIFIED GASES
Filed Nov. 20, 1956
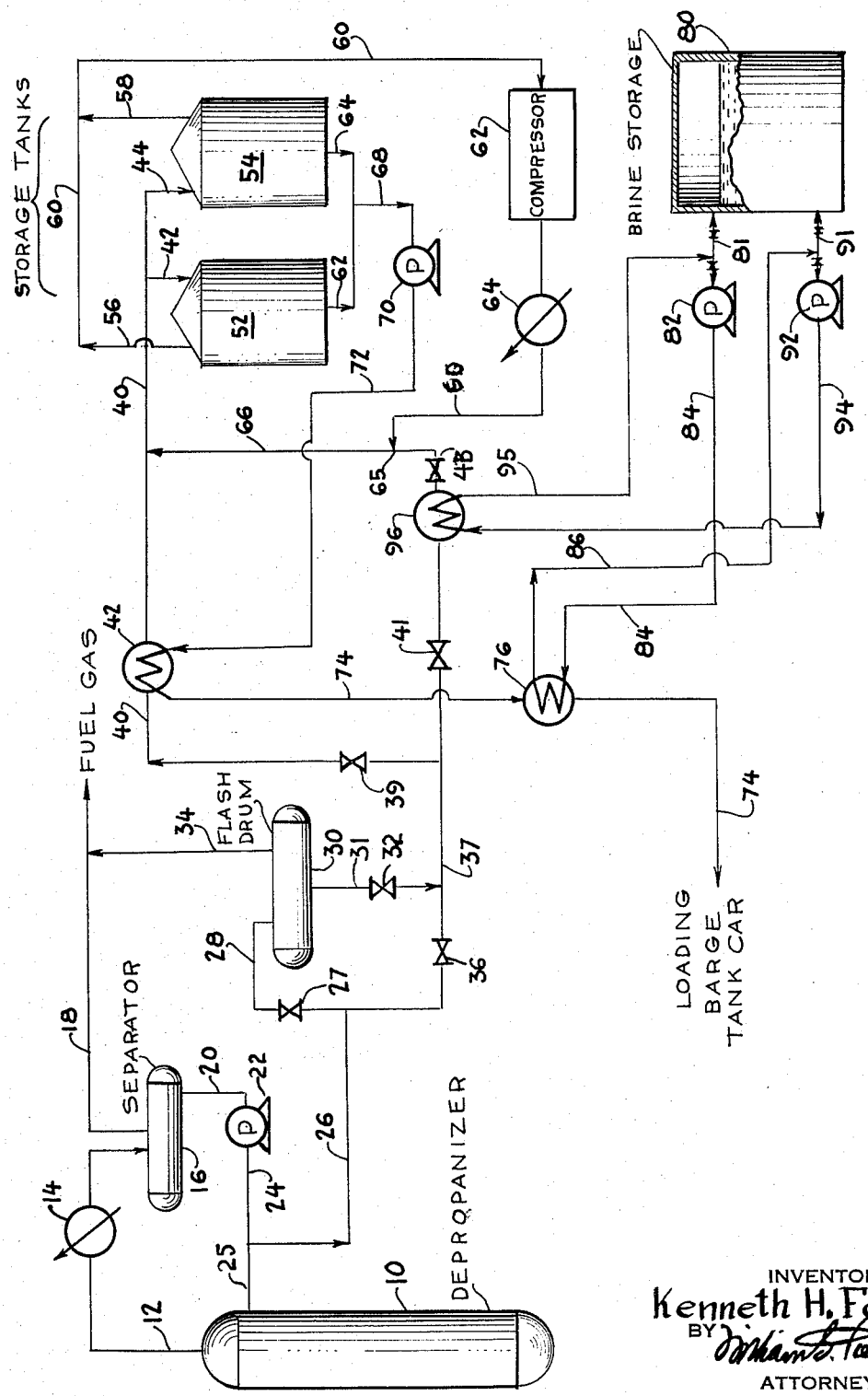
INVENTOR
Kenneth H. Faulk
BY
ATTORNEY

2,884,763

STORAGE OF LIQUIFIED GASES

Kenneth H. Faulk, Lake Charles, La., assignor to Cities Service Refining Corporation, Lake Charles, La., a corporation of Delaware Application November 20, 1956, Serial No. 623,394

13 Claims. (Cl. 62—54)

This invention relates to the storage of volatile liquids. More particularly, the invention relates to the storage of butane, propane, ammonia, and other volatile fluids at atmospheric pressure.

The pressurized storage of volatile liquids such as butane, propane, and the like is common practice in industry. The pressurized storage of such fluids requires well insulated tanks of considerable strength to prevent losses due to varying atmospheric conditions. Such tanks are expensive to construct and are generally of limited capacity. Under certain circumstances, the storage of such volatile liquids at atmospheric pressure is considered desirable. However, the widespread use of atmospheric storage for volatile liquids is seriously limited by the large refrigeration loads that are required to provide the necessary low temperatures at which such volatile materials can be stored at low pressure. For example, storage of propane at atmospheric pressure requires a temperature of −44° F., while atmospheric storage of butane requires a temperature of 32° F. for storage at atmospheric pressure.

Storage of volatile liquids at atmospheric pressure can often be justified where a favorable heat exchange balance can be maintained between the production stream of hot volatile liquid being passed to storage and the cold loading stream being withdrawn from storage. This situation is rare, however, since in most installations, the production stream to storage will flow at a continuous comparatively low rate, while the loading stream, the stream withdrawn from storage, will flow intermittently, and then at substantially higher rates than the rate at which fluids are passed to storage. To provide a refrigeration system under these conditions would make economic justification of atmospheric storage of volatile liquid particularly difficult since the system would have to be designed for the situation when hot volatile material was being passed to storage but no cold material was being withdrawn from storage to provide the necessary cooling of feed to storage.

It is accordingly an object of the present invention to provide a method for the atmospheric storage of volatile liquids possessing maximum economies in refrigeration requirements.

It is another object of the present invention to reduce refrigeration requirements in an atmospheric storage system for volatile liquids in which there is substantially constant feed to storage and intermittent withdrawal from storage.

It is a further object of the present invention to more effectively balance the heat load in a volatile liquid storage system in which there is continuous delivery to storage at a substantially constant low rate, but intermittent withdrawal for loading purposes at comparatively high rates.

It is a still further object of the present invention to store volatile liquids under conditions which provide minimum operating costs for a refrigeration system under a wide variety of loadings over extended periods of time.

Figure 1 shows diagrammatically a system for the storage at atmospheric pressure of a volatile liquid in accordance with the present invention.

The foregoing objects are obtained most effectively according to my invention by utilizing with the refrigeration system an independent heat exchange medium which acts as a heat sink. This heat sink or heat transfer medium will provide a substantial portion of the required cooling of the stream passing to storage, as well as the desired heating of the stream from storage which is being passed to pressurized distribution means such as barges, tank cars and the like. The independent heat exchange medium utilized in my invention is particularly adapted to absorb heat from the production line over comparatively long periods of time and provide heat for the loading stream during considerably shorter periods of time. The amounts of liquid passing to and from storage will necessarily govern the size of refrigeration equipment necessary, but the method of my invention will reduce normal refrigeration requirements of an atmospheric storage system as much as fifty percent under certain circumstances. In any installation, however, in which storage of volatile liquid is carried out according to the method of my invention, refrigeration capacity can be substantially reduced.

When carrying out the storage at atmospheric pressure of volatile fluids according to the method of my invention, it is necessary initially to flash a portion of the stream being passed to storage at an intermediate pressure so as to obtain initial cooling of this stream, with the required final cooling being supplied by flashing to the storage pressure with vapor recovery by compression and condensation. The intermediate flash operation or reduced production to storage during startup is required because of the lack of a cold storage stream for heat exchange with feed passing to storage, as well as the lack of cold heat exchange medium which during normal operation of continuous delivery to storage and intermittent withdrawal supplies the additional cooling required that permits reduction in refrigeration capacity.

After the initial flash operation has filled the storage vessel, or at least filled the storage vessel sufficiently to permit effective withdrawal for loading purposes, the initial flash operation is discontinued, and the feed to storage is passed in heat exchange, with cold liquid being withdrawn from storage for distribution. Since the volatile liquid withdrawn from storage is at a low temperature, cooling of the feed passing to storage can be accomplished by this heat exchange, with the final reduction to storage temperature being accomplished by refrigeration. The heat exchange between incoming feed and liquid withdrawn from storage results in an increase in temperature of the liquid withdrawn from storage. A further increase in temperature of this liquid, i.e. liquid from storage, passing to the loading facilities is accomplished by heat exchange with an independent heat transfer medium. The heat transfer medium passed in exchange with the liquid withdrawn from storage will give up heat to the storage liquid. This cooled heat exchange medium can then be utilized to provide a substantial portion of the cooling required for incoming feed during periods when no withdrawal of cold liquid from storage is being accomplished. The heat exchange between incoming feed and the heat transfer medium results in a substantial lowering in the feed temperature, with storage temperature of the feed being obtained by flash vaporization at the storage pressure with subsequent vapor recovery by compression and condensation.

Referring now to the drawing, column 10 represents the source of volatile liquid, for the storage of which my invention is particularly applicable. Numeral 10 identifies the depropanizer column of a conventional refinery distillation unit in which separation of light materials such as methane, ethane, propane, butane, and the like is accomplished by pressure distillation.

In the description of my invention which follows, reference will generally be made to propane as the volatile liquid, it of course being understood that reference to propane is merely for convenience in describing the invention, since the method of my invention has application to the storage of any number of volatile materials at atmospheric pressure. In most installations the volatile liquid will not be under pressures greater than about 400 p.s.i. In those instances where the volatile liquid is obtained at higher pressures, means will be provided in the system prior to storage to lower the pressure to the desired operating level.

As shown in the drawing, propane is taken overhead from the depropanizer in line 12, passed through condenser 14, and into separator 16. Therein a portion of the propane vapor will be vented and withdrawn in line 18. This vapor can be flared, used as fuel gas or passed to such other use as desired. Liquid separated in 16 is withdrawn in line 20 and passed by pump 22 to tower reflux in line 24 and 25 or to storage by way of line 26. The amount of liquid propane returned to tower 10 as reflux varies, but in any event the net production will eventually be passed to storage by way of line 26.

When storage tanks 52 and 54 are being filled initially, valve 36 is closed and valve 27 opened to permit the flow of total production minus tower reflux into flash drum 30. In drum 30, operated at reduced pressure, a portion of the propane will be flashed, with the flashed vapor being withdrawn in line 34. If desired, the flashed vapor may be combined with vapor withdrawn from separator 16 and the combined vapors utilized as desired. The liquid propane in flash drum 30, now considerably reduced in temperature by reason of the flash operation, is withdrawn in line 31 and passed by line 37 through heat exchanger 42 and directly to storage tanks 52 and 54. To obtain this flow, valve 41 will be closed and valve 39 will be opened. The inlet lines 42 and 44 are provided with back-pressure valves, not shown, which during initial operation are maintained fully opened. A flow control valve is utilized in line 40 to control the liquid level in drum 30 and also to prevent the overloading of the compressor by preventing excessive flow to storage. The liquid delivered to the storage tanks after flash in drum 30 will be at such a temperature and of such an amount that the vapor resulting from flashing to storage pressure can be compressed by 62 condensed at 64 and returned to storage. The amount of flash required will, of course, depend on the quantity and temperature of the fluid being delivered to the flash drum, and in most cases flashing of up to approximately 40% can be economically justified during start-up depending of course, on the value of the alternate use of vapor leaving the flash drum. The delivery of feed to storage will generally be continuous and at a rather low rate compared to the rate at which stored fluid is withdrawn from storage.

The lowering of the temperature of the feed liquid after the intermediate flash, to the required storage temperature is accomplished by flashing to the storage pressure. The vapor will be withdrawn in line 56 or 58 depending on the tank being charged and passed in line 60 to compressor 62, from which compressed vapor is withdrawn and condensed at 64. Thereafter, the condensed vapor is returned to storage through line 60 into line 66 at 65 and then into line 40 with the incoming feed. Valve 43 remains closed during start-up so that the condensed vapor flows to line 40.

Once the storage tanks have been filled, or substantially filled, and withdrawal from storage is undertaken, it is no longer necessary to carry out the flashing operation in drum 30 as described. Since the liquid in storage in the case of propane will have a temperature of −44° F., this material after withdrawal from storage is used to cool incoming feed being passed to storage. During withdrawal, drum 30 is blocked by closing valves 27 and 32, and valves 36 and 39 are opened to permit passage of feed to storage by way of lines 37 and 40. Valve 41 at this time remains closed since the heat transfer medium utilized for abstracting heat from feed to storage has not yet been cooled sufficiently to be utilizable in providing additional cooling of feed as hereafter described. The choice of whether feed will pass through exchanger 42 or exchanger 96 depends on whether or not propane is being withdrawn from storage for distribution. If propane is being so withdrawn, exchanger 42 will be utilized. Whereas if no propane is being withdrawn from storage and there is a sufficient amount of low temperature heat transfer medium available, exchanger 96 will be utilized.

If sufficient cold propane is present in storage, and withdrawal from storage is undertaken, flow will be through exchanger 42 so as to obtain maximum benefit of the cold liquid from storage. When this situation exists, storage propane is withdrawn from the storage tanks by way of line 62 or 64, line 68, and passed by way of pump 70 and line 72 through heat exchanger 42. In exchanger 42, the propane from storage cools the propane passing to storage. This heat transfer results in an increase in temperature of the propane from storage. This temperature increase is desirable since under ordinary conditions, distribution of the propane will take place from pressurized vessels wherein the liquid may have a temperature considerably higher than the temperature at which it was stored at atmospheric pressure. This increase in temperature is desired in order to eliminate the possibility of freeze-up, moisture freezing on the vessel, and the thermal shock on the vessel going from ambient temperature to sub-zero temperature very rapidly. In order to obtain maximum utilization of the low temperature propane from storage, after indirect heat exchange with feed in exchanger 42, the warmed propane is passed through heat exchanger 76 in line 74. In exchanger 76, the independent heat transfer medium is utilized.

It is the use of the independent heat transfer media in the refrigeration cycle described that provides the substantial savings in the refrigeration requirements of my invention. The transfer medium in storage drum 80 will generally be one having a very low freezing temperature and is preferably a brine type of solution such as calcium chloride. Other liquids will serve equally as well as the heat transfer media provided they possess low freezing temperature. For example, the following solutions can be used in place of a brine solution: 45% methanol, 53% ethylene glycol, 63% denatured alcohol, and 65% glycerol. If the problem of freeze-up were not important, magnesium chloride or sodium chloride could also be used as the heat transfer media as well as more dilute solutions of methanol, ethylene glycol, denatured alcohol and glycerol. The quantity of brine required to provide the range in temperature necessary to effect the desired heating and cooling would, of course, depend on the specific heat of the solution used, as well as the characteristics and quantity of the material being stored.

Hereafter the heat transfer medium will be referred to as brine, it of course being understood that any of the solutions referred to above can be utilized.

In order to obtain the brine at the required low temperature, it will be passed in heat exchange with cold feed being passed to loading. In accomplishing this, brine withdrawn in line 81 from storage is passed by pump 82 and line 84 through exchanger 76, and returned to storage by way of line 86. If the hot brine is not withdrawn from storage, it can be obtained directly from exchanger 96 wherein it absorbs heat from feed passing to storage. After heat exchange in 76, the brine is returned to storage by way of line 91 or passed by pump 92 and line 94 through exchanger 96 for indirect heat exchange with feed now passing through line 37 and 66 to storage. This cycling of the cold brine will be accomplished during intervals when there is no withdrawal of cold liquid from storage and continuous production is being passed to storage. Under these circumstances, total production will be passed through line 37 and heat exchanger 96 by closing valve 39 and opening valves 41 and 43. In exchanger 96, cold brine with-age or circulated from heat exchanger 76 is passed by pump 92, line 94, through exchanger 96. In exchanger 96, substantial reduction in the temperature of the feed to storage will be accomplished. Further cooling of the feed to the required storage temperature is accomplished by flash vaporization at storage pressure and subsequent vapor recovery as previously described. The vapor that is flashed at storage pressure is returned by mixing with the feed at 65, after being compressed and condensed. Since a considerable volume of cold brine is obtained in heat exchanger 76, continuous flow of feed to storage in line 37 for comparatively long periods of time but at substantially lower rates than the withdrawal rate from storage can be accomplished in exchanger 96 without further refrigeration.

When withdrawal from storage is again undertaken and loading of barges or tank cars contemplated, valve 41 will be closed and valve 39 open so that heat exchange between cold storage liquid and hot feed liquid will be accomplished in 42. During this cycle, the hot brine withdrawn from storage in 81 will be cooled in exchanger 76 and returned to storage in lines 86 and 91.

Sufficient quantity of brine must be available to furnish the required amount of heat to the liquid from storage and subsequently remove a like amount of heat from the liquid to storage. In order to accomplish this, if a single brine storage vessel is used, a baffle system is used to maintain thermal separation. If desired, separate brine storage tanks may be used for hot and cold brine, with a valve system that permits withdrawal of cold brine from storage to cool incoming feed and hot brine to increase the temperature of stored liquid passing to loading facilities in 76.

In the example which follows, 7000 barrels per day of L.P.G. propane is to be stored at atmospheric pressure in two 15,000 barrel storage tanks according to the method of my invention. The brine heat transfer medium utilized is a 31.2 weight percent solution of calcium chloride. To provide the required heat transfer which will effect maximum reduction in refrigeration requirements, 5500 barrels of brine is required.

According to the method of my invention, propane at a temperature of 110° F. and a pressure of 300 p.s.i.g. is withdrawn from the depropanizer at the rate of 7000 barrels per day, and passed through condenser 14 into separator 16, with substantially the total production being withdrawn from the separator in line 20 and passed by way of pump 22, lines 24, 26 and 28, to flash drum 30. Valve 36 is closed during flash operation conducted during initial filling of the storage tanks. In drum 30, approximately 30% of the propane is flashed off as vapor, thereby lowering the temperature of the remaining propane to approximately 40° F. and the pressure from 300 p.s.i.g. to approximately 50 p.s.i.g. With valves 36 and 41 closed, liquid propane withdrawn from drum 30 is passed through valve 31, lines 37 and 40, through heat exchanger 42.

To reduce the temperature of the propane to the —44° F. storage temperature, 682 mols per hour of propane vapor is flashed from storage, compressed in 62, condensed in condenser 64, and passed by way of line 66 to line 40 wherein it is mixed with the propane being delivered by line 40 to the storage tanks.

After a sufficient quantity of propane has been collected in the storage tanks to permit loading operations, as for example when one tank is filled to at least one-third capacity withdrawal from storage can be undertaken. Once withdrawal is initiated, the flash operation conducted in drum 30 is discontinued, by closing valves 27 and 31. If withdrawal is to be carried out at the rate of 1000 barrels per hour, for example, propane is withdrawn by way of line 62 or 64, and line 68 passed through pump 70, and line 72, through heat exchanger 42, wherein cold liquid propane is heat exchanged with the hot feed passing to storage. The heat exchange in 42 results in a lowering of the feed temperature in line 40 from 110° F. to —34° F. A further reduction in temperature of the propane passing to storage to —44° F. is accomplished by flash vaporization and subsequent vapor recovery. The propane withdrawn from storage after passage through heat exchanger 42 has a temperature of about 4° F. A further increase in temperature of this stream passing to 90° F. is obtained in heat exchanger 76 by indirect heat exchange with the brine solution withdrawn from storage in line 81 and passed by pump 82 through line 84 to exchanger 76. To accomplish the simultaneous increase in the loading stream temperature and decrease in the brine temperature, 306 gallons per minute of brine at 100° F. is passed through exchanger 76. The outlet stream of brine in line 86 will have a temperature of 14° F. From 76 the brine is passed directly to storage 80 by way of line 91, or circulated by pump 92 in line 94 through heat exchanger 96, and returned to storage from exchanger 76 by way of lines 95 and 81. During withdrawal of propane from storage, continuous cooling of brine is accomplished in 76. This cold brine will be stored in 80 and withdrawn at the rate of about 82 gallons per minute when cooling is to be carried out in exchanger 96. Cooling in 96 is accomplished during periods when feed is passing to storage by way of lines 37, 66 and 40, with no withdrawal being carried out. Under these circumstances, valve 39 is closed and valve 41 open to permit flow through 96. The 14° F. brine reduces the 110° F. propane in line 37 to approximately 24° F. Further reduction in the temperature of the propane passing to storage is accomplished by flash vaporization at the storage pressure with subsequent vapor recovery. The storage temperature of —44° F. is attained and subsequently maintained by the vaporization of propane. The propane vapors are recovered by being compressed, condensed and returned to storage. Brine returned to storage or exchanger 76 in line 95 will have a temperature of 100° F. This material, as indicated, can be passed to storage or circulated through exchanger 76 by way of pump 82 and line 84.

If the brine solution were not utilized in cooling the feed to storage during periods of no withdrawal from storage, the compression refrigeration system would have to be increased in capacity by approximately 100% in order to provide the required cooling of hot propane passing to storage. Utilization of the brine system to recover heat from the feed to storage during periods of no withdrawal provides a most effective means for heat savings.

In storing volatile liquids according to the method of my invention, it is, of course, understood that the feed and withdrawal rates can be varied considerably and that the brine circulating rates would vary accordingly.

While the foregoing description has been limited to propane, it is to be understood that the invention has application to any volatile liquid. The storage of volatile liquids other than propane would necessarily require variations in operating conditions to satisfy the characteristics of the liquid being stored.

The application of my invention is particularly useful under the conditions described wherein the volatile liquid to be stored is produced or obtained at a low generally constant rate, but is withdrawn from storage intermittently and often at higher rates than the rate at which it was sent to storage. Utilization of the heat transfer medium according to my invention, and in particular the flash feature utilized in start-up is believed to provide considerable advantage over the total refrigeration systems presently utilized for the atmospheric storage of volatile liquids.

It is recognized that changes may be made in the method described without departing from the invention. It is intended that the description be interpreted as being illustrative of the invention and that the invention be in no way limited other than by the following claims.

I claim:

1. The method of storing volatile liquid at reduced pressure by maintaining said liquid at a low temperature, wherein said volatile liquid is delivered to storage at substantially constant rate and intermittently withdrawn, which comprises flashing a portion of liquid delivered to storage, withdrawing the vaporized liquid from storage, compressing the vaporized liquid, condensing the compressed vapor, mixing the condensed vapor with hot volatile liquid being delivered to storage, withdrawing cold liquid from storage for delivery purposes, passing the cold liquid from storage in indirect heat exchange with volatile liquid being delivered to storage, passing the liquid withdrawn from storage in indirect heat exchange with a heat transfer medium, whereby the temperature of the liquid withdrawn from storage is increased and the temperature of the heat transfer medium is reduced, and passing the cooled heat transfer medium to storage.

2. In the method of storing a volatile liquid at reduced pressure by maintaining the volatile liquid at low temperature, wherein the volatile liquid is delivered to storage at a substantially constant rate and intermittently withdrawn, the steps comprising introducing one portion of hot pressurized volatile liquid to a flash drum, said flash drum maintained at conditions which effect flashing of a sufficient amount of the volatile liquid to provide a temperature reduction in the liquid of at least about 50%, venting flashed vapors and withdrawing cooled liquid from the flash drum, mixing sufficient refrigerated volatile liquid with the cooled liquid from the flash drum to reduce the temperature of the total mixture to storage temperature, passing the cooled liquid from the flash drum to storage, by-passing said flash drum with the remaining portion of hot pressurized volatile liquid vaporizing a portion of the liquid in storage by flashing so as to cool the liquid in storage, intermittently withdrawing cold liquid from storage for delivery purposes, passing the withdrawn storage liquid in heat exchange with feed which has by-passed the flash drum, passing the liquid from storage after heat exchange with the hot feed in heat exchange with an independent hot heat transfer medium, passing the heated liquid from storage after heat exchange to loading facilities, and passing cooled heat transfer medium to storage.

3. In the method of storing a volatile liquid at atmospheric pressure by maintaining the liquid at low temperature, wherein the volatile liquid is delivered to storage at a substantially constant rate and intermittently withdrawn from storage at a rate higher than the rate at which the liquid is passed to storage, the steps comprising introducing a portion of hot pressurized volatile feed liquid to a flash drum maintained under conditions which effect flashing of a sufficient amount of the volatile liquid to provide a temperature reduction in the liquid of at least about 50%, venting flashed vapors and withdrawing cooled liquid from the flash drum, passing the cooled liquid to storage, flashing a portion of the cooled liquid in storage, compressing the flashed vapors from storage, condensing the compressed vapors and returning the condensed vapors to storage, withdrawing cold liquid from storage for delivery purposes, passing liquid withdrawn from storage for delivery purposes in heat exchange with the remaining portion of hot pressurized volatile feed which has by-passed the flash drum, passing the liquid from storage after indirect heat exchange with the hot feed in indirect heat exchange with a hot heat transfer medium so as to simultaneously increase the temperature of the liquid from storage and decrease the temperature of the heat transfer medium, ceasing withdrawal of liquid from storage and passing the cold heat transfer medium in heat exchange with feed to storage after withdrawal of cold liquid from storage has ceased, before passage of heat transfer medium to storage.

4. In the method of storing a volatile liquid at reduced pressure by maintaining the volatile liquid at low temperature, wherein the volatile liquid is delivered to storage at a substantially constant rate and intermittently withdrawn at a rate higher than the rate at which the liquid is passed to storage, the steps comprising introducing hot pressurized volatile liquid to a flash drum maintained at conditions which effect flashing of a sufficient amount of the volatile liquid to provide a temperature reduction in the liquid of at least about 50%, venting flashed vapors and withdrawing cooled liquid from the flash drum, passing the cooled liquid to storage, flashing a portion of the cooled liquid in storage, compressing the flashed vapors from storage, condensing the compressed vapors and returning the condensed vapors to storage, intermittently withdrawing cold liquid from storage for delivery purposes, blocking the flash drum, passing cold liquid withdrawn from storage for delivery purposes in indirect heat exchange with feed passing to storage thereby simultaneously cooling the feed passing to storage and increasing the temperature of liquid withdrawn from storage, further cooling the liquid passing to storage by flash vaporization at storage pressure, passing warmed liquid from storage after heat exchange with feed to storage in heat exchange with a hot heat transfer agent so as to further increase the temperature of the storage liquid substantially to the desired delivery temperature and reduce the temperature of the heat exchange medium, and passing cold heat exchange medium in indirect heat exchange with feed to storage when no withdrawal from storage is being carried out so as to simultaneously cool feed passing to storage and heat the heat transfer medium.

5. The method of storing a volatile liquid at reduced pressure as claimed in claim 4, wherein the heat transfer medium is a brine solution.

6. The method of storing a volatile liquid at reduced pressure as claimed in claim 5, wherein the brine solution is a calcium chloride solution.

7. The method of storing propane at atmospheric pressure, wherein propane is passed to storage at a low substantially continuous rate and withdrawn from storage for pressurized delivery intermittently and at higher rates than the rate at which propane is passed to storage, which comprises introducing a first portion of pressurized propane to a flash drum maintained at a pressure low enough to permit a substantial portion of the propane to flash, by-passing said flash drum with the second and remaining portion of propane, venting propane vapor from the flash drum and withdrawing cold liquid propane from said flash drum, mixing the cold propane withdrawn from the flash drum with condensed propane obtained from storage, said condensed propane being obtained by flashing and compressing a portion of propane from storage, passing the combined propane streams to storage, intermittently withdrawing cold propane from storage for delivery purposes and passing the same in indirect heat exchange with the second portion of propane passing to storage which has by-passed the flash drum, said indirect heat exchange resulting in the simultaneous increase in the temperature of the propane from storage and a decrease in the temperature of the propane passing to storage, passing the warmed propane after heat exchange with hot propane feed through a heat transfer zone in indirect contact with a hot brine solution, passing hot propane to loading facilities at the desired loading temperature, and passing cold brine to storage.

8. The method of storing propane as claimed in claim 7, wherein brine cooled by heat exchange with propane being delivered to the loading facilities is passed in heat exchange with feed to storage, which feed has by-passed the flash drum and the heat exchange zone in which it is indirectly exchanged with hot propane from storage, and passing hot brine after contact with hot feed to brine storage.

9. The method of storing propane at atmospheric pressure wherein propane is passed to storage at a low substantially continuous rate and withdrawn from storage for pressurized delivery intermittently and at higher rates than the rate at which propane is passed to storage, which comprises introducing a portion of pressurized propane to a flash drum maintained at a pressure low enough to permit a substantial portion of the propane to flash, venting propane vapor from the flash drum and withdrawing cold liquid propane from said flash drum, by-passing said flash drum with the remaining portion of pressurized propane not introduced to said flash drum, mixing the cold propane withdrawn from the flash drum with condensed propane obtained from storage, said condensed propane being obtained by flashing a portion of the stored liquid propane, compressing the flashed vapors and condensing the same, passing the combined propane streams to storage, intermittently withdrawing cold liquid propane from storage and passing the same in indirect heat exchange with propane passing to storage which has by-passed the flash drum, said indirect heat exchange resulting in a simultaneous increase in the temperature of the propane from storage and a decrease in the temperature of the propane passing to storage, passing the warmed storage propane after heat exchange with hot propane feed through a heat transfer zone in indirect contact with a hot brine solution, passing hot propane to loading facilities and passing cold brine to storage.

10. The method of storing propane as claimed in claim 9, wherein brine cooled by heat exchange with storage propane being passed to the loading facilities is indirectly heat exchanged with hot feed passing to storage that has by-passed the flash drum and the heat exchange zone in which it is indirectly exchanged with propane from storage and passing hot brine after contact with hot propane feed to brine storage.

11. The method of storing volatile liquid at reduced pressure by maintaining said liquid at a low temperature wherein said volatile liquid is delivered to storage at a substantially constant rate and intermittently withdrawn which comprises flashing a portion of the liquid delivered to storage, withdrawng vaporized liquid from storage, compressing the vaporized liquid, condensing the compressed vapor, mixing the condensed vapor with hot volatile liquid being delivered to storage, withdrawing cold liquid from storage for delivery purposes, passing the cold liquid withdrawn from storage in heat exchange with volatile liquid being deilvered to storage, passing the liquid withdrawn from storage in indirect heat exchange with a heat transfer medium after heat exchange with feed passing to storage whereby the temperature of the liquid withdrawn from storage is increased and the temperature of the heat transfer medium is reduced, and passing the cooled heat transfer medium in indirect heat exchange with feed passing to storage prior to the mixing of condensed vapor with the hot volatile liquid being delivered to storage.

12. The method of storing volatile liquid at reduced pressure by maintaining said liquid at a low temperature wherein said volatile liquid is delivered to storage at a substantially constant rate and intermittently withdrawn which comprises flashing a portion of liquid being delivered to storage, withdrawing the vaporized liquid from storage, compressing the vaporized liquid, condensing the compressed vapor, mixing the condensed vapor with a first portion of volatile liquid being delivered to storage, withdrawing cold liquid from storage for delivery purposes, passing the cold liquid from storage in indirect heat exchange with a second portion of volatile liquid being delivered to storage, passing the liquid withdrawn from storage in indirect heat exchange with a heat transfer medium, whereby the temperature of the liquid withdrawn from storage is increased and the temperature of the heat transfer medium is reduced, and passing the cooled heat transfer medium in indirect heat exchange with feed passing to storage prior to the mixing of condensed vapor with the first portion of unflashed liquid being delivered to storage.

13. The method of storing volatile liquid at reduced pressure by maintaining said liquid at a low temperature wherein said volatile liquid is delivered to storage at a substantially constant rate and intermittently withdrawn which comprises fishing a portion of liquid being delivered to storage, withdrawing the vaporized liquid from storage, compressing the vaporized liquid, condensing the compressed vapor, mixing the condensed vapor with unflashed volatile liquid being delivered to storage, withdrawing cold liquid from storage for delivery purposes, passing the cold withdrawn liquid from storage in indirect heat exchange with unflashed volatile liquid being delivered to storage, passing cold liquid withdrawn from storage in indirect heat exchange with a warm heat transfer medium, whereby the temperature of the liquid withdrawn from storage is increased and the temperature of the heat transfer medium is reduced, passing the warmed liquid withdrawn from storage to delivery, passing the cooled heat transfer medium in indirect heat exchange with unflashed volatile liquid being delivered to storage prior to the mixing of the unflashed volatile liquid being delivered to storage with the cold volatile liquid being withdrawn from storage.

References Cited in the file of this patent
UNITED STATES PATENTS
2,682,154  Wilkinson _____ June 29, 1954